United States Patent Office 3,022,160
Patented Feb. 20, 1962

3,022,160
RECONDITIONING FUEL ELEMENTS
Herman L. Brandt, Richland, Wash., assignor to the United States of America as represented by the United States Atomic Energy Commission
No Drawing. Filed Dec. 5, 1956, Ser. No. 626,556
4 Claims. (Cl. 75—97)

This invention deals with a process of reconditioning fuel elements of nuclear reactors, and more particularly with a method of removing the aluminum jackets or cans and/or the bond layers with which the aluminum jacket is bonded to the uranium-containing cores.

Uranium bodies for fuel elements of nuclear reactors have to be canned in a protective metal, such as aluminum, in order to prevent access of the atmosphere and/or of cooling water to the uranium, which would cause an undesirable reaction. The socalled canning is usually done by immersing the uranium core in molten bronze or lead, optionally followed by an immersion in tin, and finally dipping in the bond proper, which is molten aluminum-silicon alloy and preferably the eutectic. The aluminum-silicon alloy bonds the uranium to the aluminum can by reacting with the uranium to form a uranium-silicon compound and a uranium-aluminum alloy.

Quite a number of fuel elements usually have to be rejected on account of flaws and, in particular, on account of leaks in the cans through which the cooling water of the reactor could have access to the core and react therewith. By this, the dimensions of the fuel elements would change, in most cases increase, and cause jamming of the fuel elements which would make the operation of the reactor very hazardous.

These rejected, flawy fuel elements have to be decanned in order to provide them with new aluminum cans. Decanning is also necessary as a preliminary step of processing neutron-bombarded fuel elements for the separation and recovery of the various elements formed and contained in the core of the fuel elements.

The process preferably used heretofore for decanning comprises dissolving the aluminum can and the aluminum-silicon bonding layer in an aqueous solution of a sodium hydroxide-sodium nitrate mixture, then dissolving some of the compounds formed by the bond and the uranium core in hydrofluoric acid, and finally treating the core with nitric acid to dissolve the uranium-aluminum alloy formed. This process, although it yielded excellent results, showed several drawbacks. It requires a comparatively long period of time; the handling of hydrofluoric acid and nitric acid is rather hazardous; and, finally, the acids dissolved uranium to an undesirably high degree so that some of the uranium was lost in the process.

It is an object of this invention to provide a process for removing an aluminum-silicon bond from uranium-containing bodies and also compounds formed between said bond and uranium in which the drawbacks listed above are overcome.

It is thus an object of this invention to provide a process for removing an aluminum-silicon bond from uranium-containing bodies and also compounds formed between said bond and uranium which can be carried out in a comparatively short period of time.

It is a further object of this invention to provide a process for removing an aluminum-silicon bond from uranium-containing bodies and also compounds formed between said bond and uranium which does not involve any hazards.

It is finally also an object of this invention to provide a process for removing an aluminum-silicon bond from uranium-containing bodies and also compounds formed between said bond and uranium in which a negligibly low amount of uranium is dissolved.

It has been found that the aluminum-silicon bond, the compounds formed with it and the uranium of the core, and also minor amounts of copper, tin or lead derived from the canning process can be removed simultaneously and in a considerably shorter period of time than in the process used heretofore and described above by treating the uranium core, after removal of the aluminum can by mechanical or chemical means, with a hot concentrated solution of sodium hydroxide. Because the sodium hydroxide solution also removes the aluminum-silicon bond layer, the preliminary step of treatment with the sodium hydroxide-sodium nitrate mixture in which the aluminum can is dissolved does not have to be extended until the bond, too, has been dissolved. Furthermore, since the sodium hydroxide removes all the compounds formed between the bond and the uranium, an additional step, such as the nitric acid treatment of the conventional process described above, or a corresponding step, is not necessary.

The process of this invention thus comprises immersing the canned fuel element in an aqueous solution of sodium nitrate and sodium hydroxide for a time sufficient to dissolve the aluminum can, rinsing the fuel element with water, and then immersing the fuel element in a hot concentrated aqueous solution of sodium hydroxide. After this step and another water rinse, the uranium core is ready for pickling and recanning.

The solution for dissolving the aluminum can may be the same as that used in the conventional process described above. For instance, an aqueous solution containing from 9 to 20 percent by weight of sodium hydroxide, preferably between 9 and 16 percent, and from 35 to 12 percent and preferably from 21 to 12 percent of sodium nitrate is suitable. Details on this decanning process are given in the assignee's copending application, Serial No. 93,185, filed by Jack Flox on May 13, 1949, granted on July 7, 1959, as U.S. Patent No. 2,893,863. While in the conventional process the fuel elements had to be kept immersed in the sodium hydroxide-sodium nitrate solution for about 2½ hours, an immersion time of 1½ hours was found to be sufficient in the process of this invention. In this step the bulk of the can is dissolved; the fuel element is then rinsed with water.

The sodium hydroxide concentration of the solution to be used for the second step of this process should be at least 50 percent by weight, because lower concentrations do not dissolve uranium silicide formed by reaction of the core and the aluminum-silicon bond. As has been mentioned, the sodium hydroxide solution is used at an elevated temperature; boiling temperature was preferred because a stirring effect was then obtained at the same time. The preferred immersion time for the treatment with the concentrated sodium hydroxide solution was between 1½ and 2 hours; after this the bond and all compounds formed therewith usually had completely dissolved. After this the cores were removed from the sodium hydroxide solution and rinsed with water; they were then ready for recanning.

In the following, an example is given to illustrate the superiority of the new process over that used heretofore.

*Example*

Four 4"-long uranium slugs were canned, two by the so-called triple-dip process (which comprises immersion in bronze, then in tin and finally in an aluminum-silicon alloy) and the other two by the so-called lead-dip process (immersion in lead and then in aluminum-silicon alloy) followed by insertion into the aluminum can. One canned fuel element of each type was then treated by the process used heretofore and one fuel element each by the process of this invention for decanning. For immersion in the various solutions, the fuel elements were supported on rods of stainless steel which were arranged in the bottom of a steel tank. The level of the solution was maintained at about 1" above the fuel elements, and the solution was boiled constantly. The water boiled off was replaced from time to time to maintain the original concentration.

Two fuel elements (1 lead-dipped, the other triple-dipped) were first immersed in an aqueous solution containing sodium hydroxide in a concentration of 15 percent by weight and sodium nitrate in a concentration of 13 percent by weight. Immersion was maintained for 2½ hours and the fuel elements were then removed from the solution and rinsed with water for about 15 minutes. Thereafter, they were immersed in a 10 percent aqueous solution of hydrofluoric acid for 3 hours; this time was necessary to dissolve the bond layer of aluminum-silicon-alloy. Another water rinse of 15 minutes was applied, and the two fuel elements were then immersed in a 20 percent nitric acid. This immersion step required a period of 1 hour in order completely to dissolve uranium-aluminum alloy and any other compound formed between uranium and the bond. After this the fuel elements were again rinsed with water for 15 minutes.

The two other fuel elements were immersed in the 15 percent sodium hydroxide-13 percent sodium nitrate solution for 1½ hours, and then rinsed with water for 15 minutes. Thereafter the elements were immersed in a boiling sodium hydroxide solution of a concentration of 50 percent for 1½ hours and then again rinsed with water for 15 minutes. The uranium core had been freed thereby from all remainders of bond layer and compounds formed thereof.

The treatment of the fuel elements by the process of this invention required a total period of time of 3½ hours; this favorably compared with the 7¼ hours which were necessary for the process used heretofore. In both cases, the times were the minimum times necessary to accomplish the result desired, and in both processes the same result was accomplished with the exception that the uranium core treated by the conventional process was pitted, due to dissolution of uranium, while the uranium core treated by the process of this invention had a smooth noncorroded surface.

It will be understood that this invention is not to be limited to the details given herein but that it may be modified within the scope of the appended claims.

What is claimed is:

1. A process of decanning a uranium fuel element consisting of a uranium core, an intermediate section of bronze, tin, aluminum-silicon alloy and uranium silicide around said core, and an aluminum can around and bonded to said intermediate section, said process consisting of immersing said fuel element for about 1½ hours in a first aqueous solution, said first aqueous solution containing from 9 to 20% by weight of sodium hydroxide and from 35 to 12% by weight of sodium nitrate, whereby the aluminum can is dissolved; removing the fuel element from said solution; rinsing the fuel element with water for about 15 minutes; immersing the fuel element for about 1½ hours in a second aqueous solution at the boiling point of the latter, said second aqueous solution consisting of sodium hydroxide of a minimum concentration of 50% by weight, whereby the components of the intermediate section are dissolved and a smooth noncorroded uranium surface remains on the core; and again rinsing the fuel element with water for about 15 minutes.

2. The process of claim 1 wherein the first aqueous solution contains 15% by weight of sodium hydroxide and 13% by weight of sodium nitrate and said second aqueous solution contains the sodium hydroxide in a concentration of 50% by weight.

3. A process of decanning a uranium fuel element consisting of a uranium core, an intermediate section of lead, aluminum-silicon alloy and uranium silicide around said core, and an aluminum can around and bonded to said intermediate section, said process consisting of immersing said fuel element for about 1½ hours in a first aqueous solution, said first aqueous solution containing from 9 to 20% by weight of sodium hydroxide and from 35 to 12% by weight of sodium nitrate, whereby the aluminum can is dissolved; removing the fuel element from said solution; rinsing the fuel element with water for about 15 minutes; immersing the fuel element for about 1½ hours in a second aqueous solution at the boiling point of the latter, said second aqueous solution consisting of sodium hydroxide of a minimum concentration of 50% by weight, whereby the components of the intermediate section are dissolved and a smooth noncorroded uranium surface remains on the core; and again rinsing the fuel element with water for about 15 minutes.

4. The process of claim 3 wherein the first aqueous solution contains 15% by weight of sodium hydroxide and 13% by weight of sodium nitrate and said second aqueous solution contains the sodium hydroxide in a concentration of 50% by weight.

References Cited in the file of this patent

Flanary, P/539, Proceedings of the International Conference on the Peaceful Uses of Atomic Energy, August 1955, vol. 9, published by United Nations, N.Y., page 528.

Foster et al.: P/547, ibid., pages 546–550.